(12) United States Patent
Siebert

(10) Patent No.: US 11,457,622 B2
(45) Date of Patent: Oct. 4, 2022

(54) MOTION SENSING RODENT KILLING APPARATUS

(71) Applicant: Dennis A. Siebert, So St. Paul, MN (US)

(72) Inventor: Dennis A. Siebert, So St. Paul, MN (US)

( * ) Notice: Subject to any disclaimer, the term of this patent is extended or adjusted under 35 U.S.C. 154(b) by 255 days.

(21) Appl. No.: 16/776,684

(22) Filed: Jan. 30, 2020

(65) Prior Publication Data
US 2021/0235683 A1    Aug. 5, 2021

(51) Int. Cl.
*A01M 23/24* (2006.01)
*G01J 5/00* (2022.01)

(52) U.S. Cl.
CPC ......... *A01M 23/245* (2013.01); *G01J 5/0025* (2013.01)

(58) Field of Classification Search
CPC .............................. A01M 23/30; A01M 23/245
USPC .............................................. 43/78
See application file for complete search history.

(56) References Cited

U.S. PATENT DOCUMENTS

| | | | | |
|---|---|---|---|---|
| 2,475,871 A * | 7/1949 | James | .................. | A01M 23/30 43/78 |
| 3,362,100 A * | 1/1968 | Winkler | ................ | A01M 23/30 43/78 |
| 4,349,980 A * | 9/1982 | McKee | ................ | A01M 23/30 43/75 |
| 4,596,087 A * | 6/1986 | Pratscher | .............. | A01M 23/02 43/64 |
| 4,858,373 A * | 8/1989 | Combs | .................. | A01M 23/22 43/61 |
| 5,107,619 A * | 4/1992 | Zapata | .................. | A01M 23/30 43/58 |
| 5,109,626 A * | 5/1992 | Ha | ........................ | A01M 23/22 43/78 |
| 6,802,152 B2 * | 10/2004 | Hagen | .................. | A01M 27/00 43/78 |
| 7,690,147 B2 * | 4/2010 | Wetzel | .................. | A01M 23/38 43/98 |
| 8,984,803 B2 * | 3/2015 | Covington | .......... | A01M 25/004 43/131 |
| 11,006,621 B1 * | 5/2021 | Gehret | ................ | A01M 23/005 |
| 2009/0151222 A1 * | 6/2009 | Bruno | .................. | A01M 23/30 43/67 |
| 2010/0192450 A1 * | 8/2010 | Beresnitsky | ........ | A01M 23/005 43/58 |
| 2013/0031824 A1 * | 2/2013 | Arlichson | ............ | A01M 23/18 43/60 |
| 2014/0190068 A1 * | 7/2014 | Walsh | .................. | A01M 23/30 43/78 |

(Continued)

*Primary Examiner* — Brady W Frazier
*Assistant Examiner* — Jodutt Basrawi

(57) ABSTRACT

A motion sensing rodent killing apparatus includes a housing that has a bottom wall and a perimeter wall. The perimeter wall includes a front wall. A motion sensor is directed outwardly away from the front wall. A ram is mounted on the housing and is movable toward or away from the front wall. A driving system is mounted to the housing and is engaged with the ram. The driving system retains the ram in a set position having the panel positioned adjacent to the front wall. When the motion sensor detects motion, the driving system drives the panel away from the housing to a deployed position with sufficient force such that a rodent positioned between the panel and a facing surface is killed by the panel.

15 Claims, 7 Drawing Sheets

(56) References Cited

U.S. PATENT DOCUMENTS

2018/0077920 A1* 3/2018 Hertzler ................ A01M 23/02
2018/0317475 A1* 11/2018 Redmayne ............ A01M 27/00
2020/0187485 A1* 6/2020 Damgaard Jensen ......................
                                                          A01M 23/30
2021/0345597 A1* 11/2021 Dahlgard .............. A01M 27/00

* cited by examiner

MOTION SENSING RODENT KILLING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to rodent extermination device and more particularly pertains to a new rodent extermination device for killing rodents, and in particular mice, which are wary of conventional traps. It has been found that the common house mouse, Mus musculus, has become very adept at avoiding traps. Video surveillance has demonstrated that a house mouse will actively see, and then avoid, common mouse trap devices. Thus, when an infestation occurs in a house, restaurant or other dwelling, any mice captured or killed tend to be younger, smaller mice, while the larger, breeding mice often evade extermination.

The invention herein avoids the requirement of the rodent actually stepping into or onto a trap and provides no indication to the rodent that there is any existence at all of danger. Instead, the subject of the current specification below relates to a housing and ram combination where the housing is placed adjacent to a pathway along which the rodent travels. The ram is actuated by a motion sensor and is actuated by the rodent walking in front of the ram. When released, the ram crushes the rodent between the ram and an oppositely facing wall. Because there is nothing for the rodent to see or step into/onto, the current invention is very effective at eliminating larger mice which are more wary of conventional traps.

(2) Description of Related Art Including Information Disclosed Under 37 CFR 1.97 and 1.98

The prior art relates to rodent extermination devices such as traps, sticky-pad type capturing devices and the like which require the rodent to either step onto the device or within a housing to be captured.

BRIEF SUMMARY OF THE INVENTION

An embodiment of the disclosure meets the needs presented above by generally comprising a housing that has a bottom wall and a perimeter wall attached to and extending upwardly from the bottom wall. The perimeter wall bounds an interior of the housing. The perimeter wall includes a front wall. A motion sensor is mounted on the housing and is directed outwardly away from the front wall. A ram is mounted on the housing and extends outwardly from the front wall and is movable toward or away from the front wall. The ram includes a panel having an outer surface facing away from the housing. A driving system is mounted to the housing and is engaged with the ram. The driving system retains the ram in a set position having the panel positioned adjacent to the front wall. The driving system then drives the panel away from the housing to a deployed position with sufficient force such that a rodent positioned between the panel and a facing surface is killed by the panel. The driving system is in communication with the motion sensor such that the driving system deploys the panel when the motion sensor detects motion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
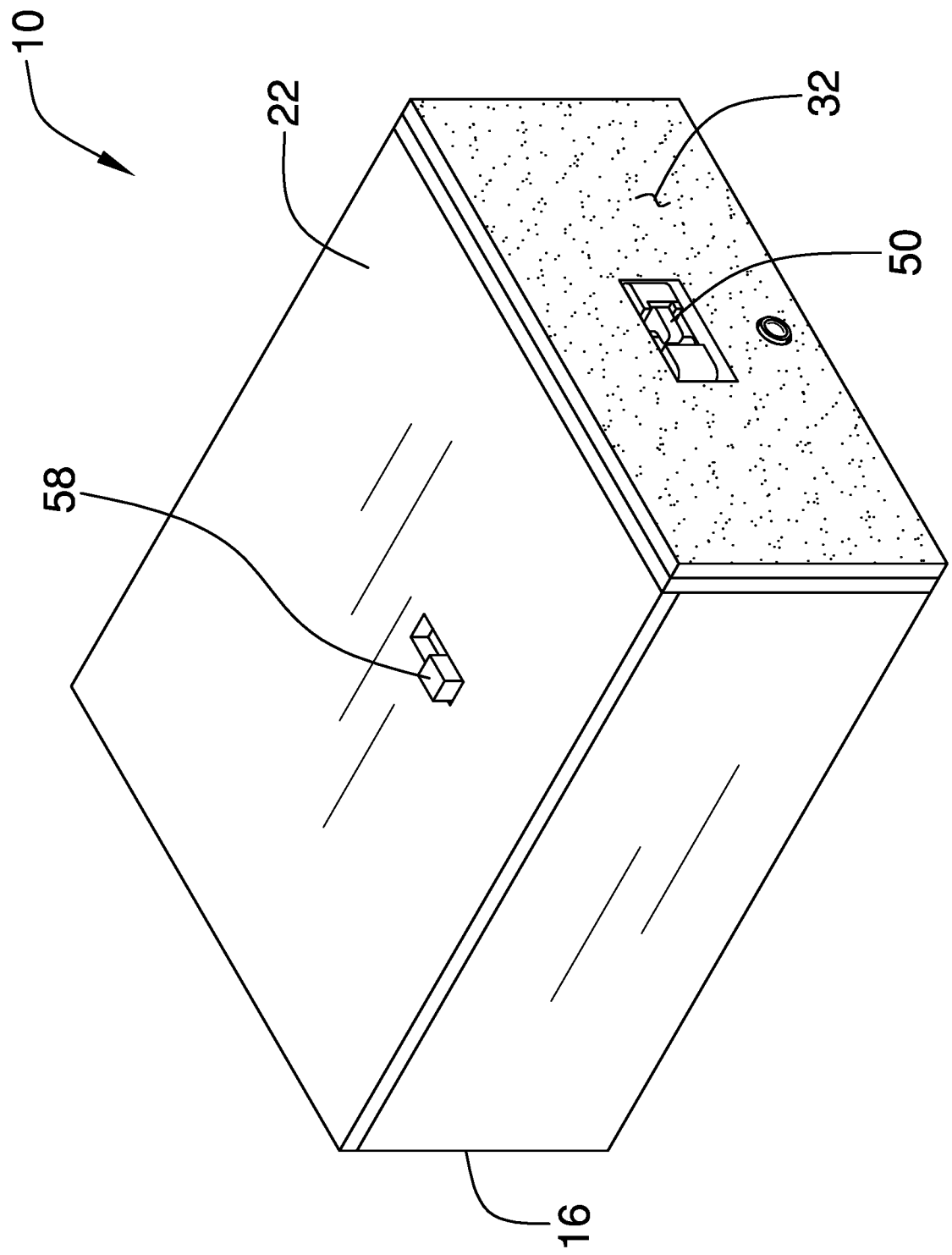
FIG. 1 is a top isometric view of a motion sensing rodent killing apparatus according to an embodiment of the disclosure.

With reference now to the drawings, and in particular to FIGS. 1 through 8 thereof, a new rodent extermination device embodying the principles and concepts of an embodiment of the disclosure and generally designated by the reference numeral 10 will be described.

As best illustrated in FIGS. 1 through 8, the motion sensing rodent killing apparatus 10 generally comprises a housing 12 that has a bottom wall 14 and a perimeter wall 16 attached to and extending upwardly from the bottom wall 14. The perimeter wall 16 bounds an interior 18 of the housing 12 and includes a front wall 20. A top wall 22 is positioned on the perimeter wall 16 and may be removable to access the interior 18 of the housing 12 though alternate openings or doors may be positioned on the housing 12 for accessing the same.

A motion sensor 24 is mounted on the housing 12 and is directed outwardly away from the front wall 20. The motion sensor 24 may comprise any conventional motion sensor, though the motion sensor 24 will typically comprise a passive motion sensor. More particularly the motion sensor 24 may be configured to detect infrared radiation, such as the body heat coming from a rodent 26. The term "rodent" herein is used in its common meaning though mice and rats are most typical type of rodent the apparatus 10 will be used against.

Figure 2:
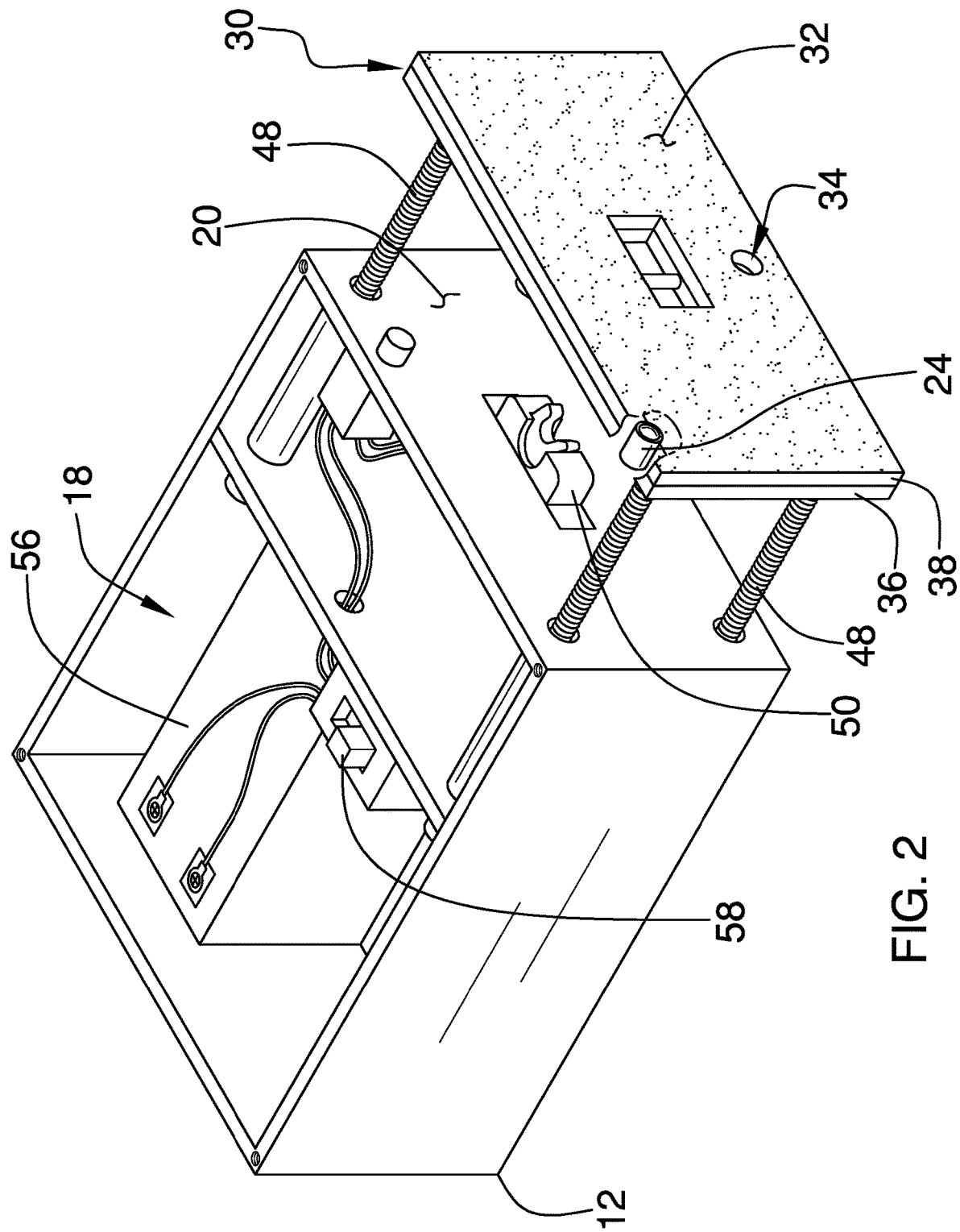
FIG. 2 is a top isometric view of an embodiment of the disclosure.
Figure 3:
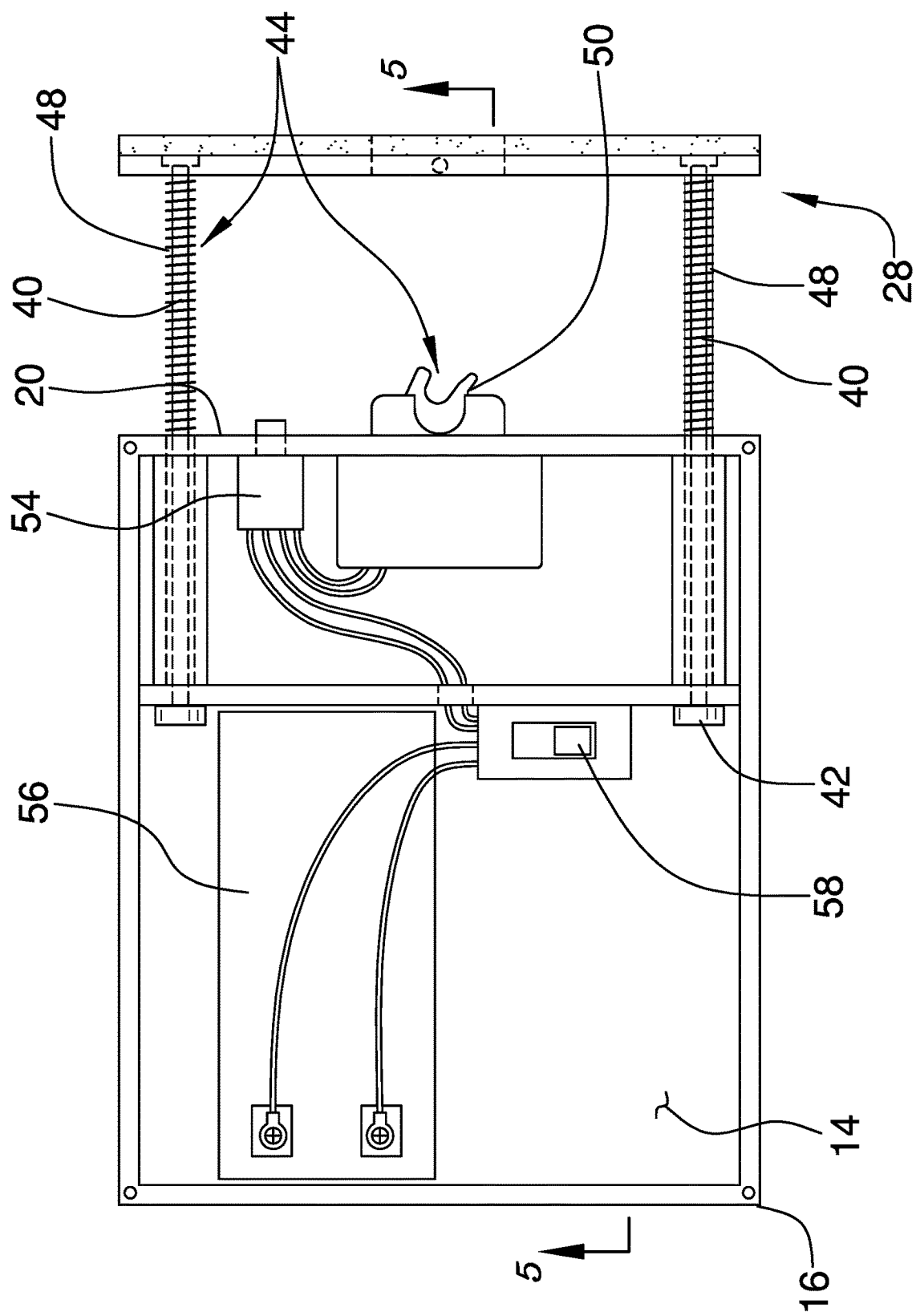
FIG. 3 is a top view of an embodiment of the disclosure.
Figure 4:
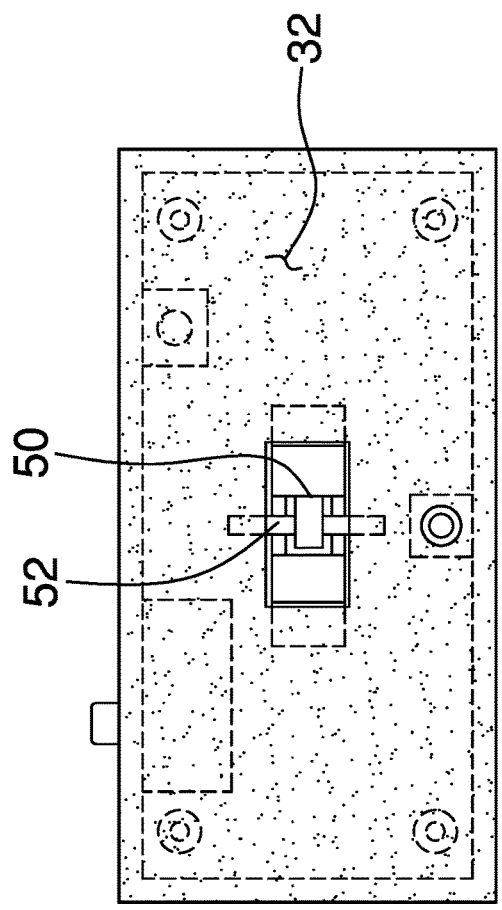
FIG. 4 is a front view of an embodiment of the disclosure.
Figure 5:
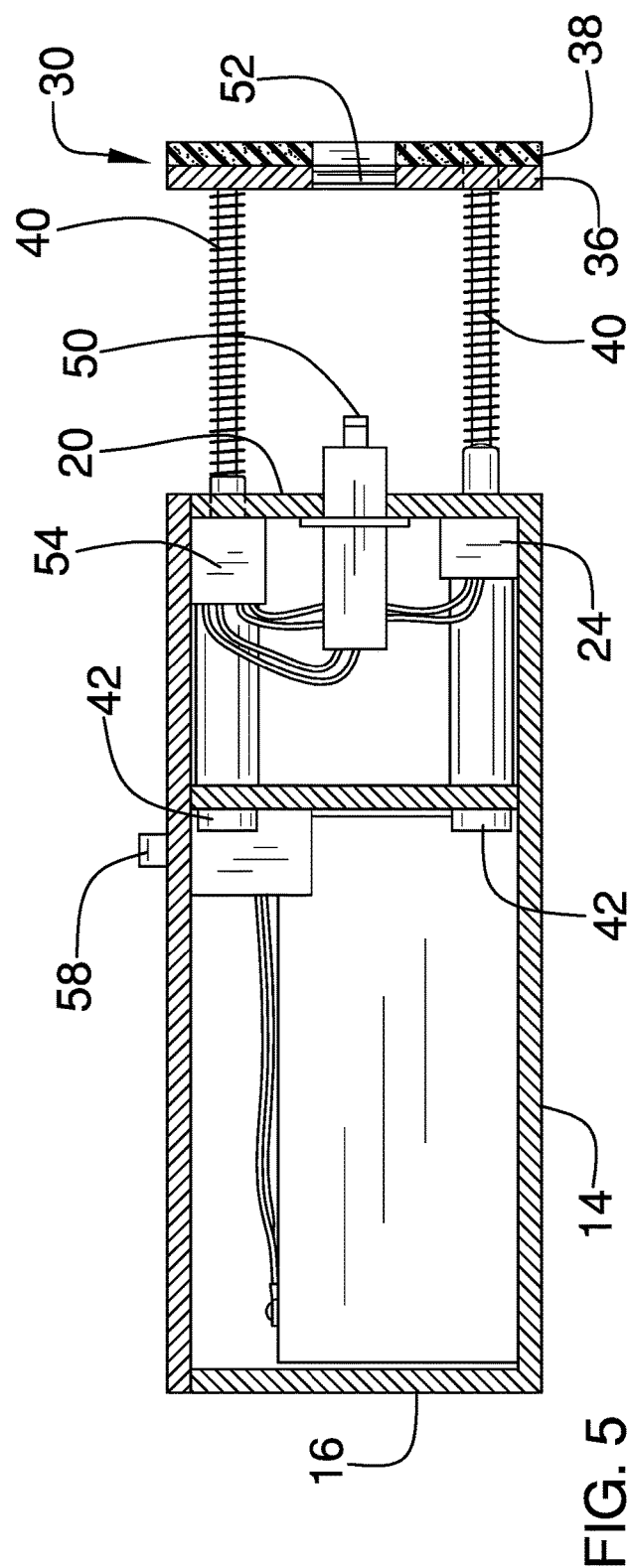
FIG. 5 is a cross-sectional view of an embodiment of the disclosure taken along line 5-5 of FIG. 3.
Figure 6:
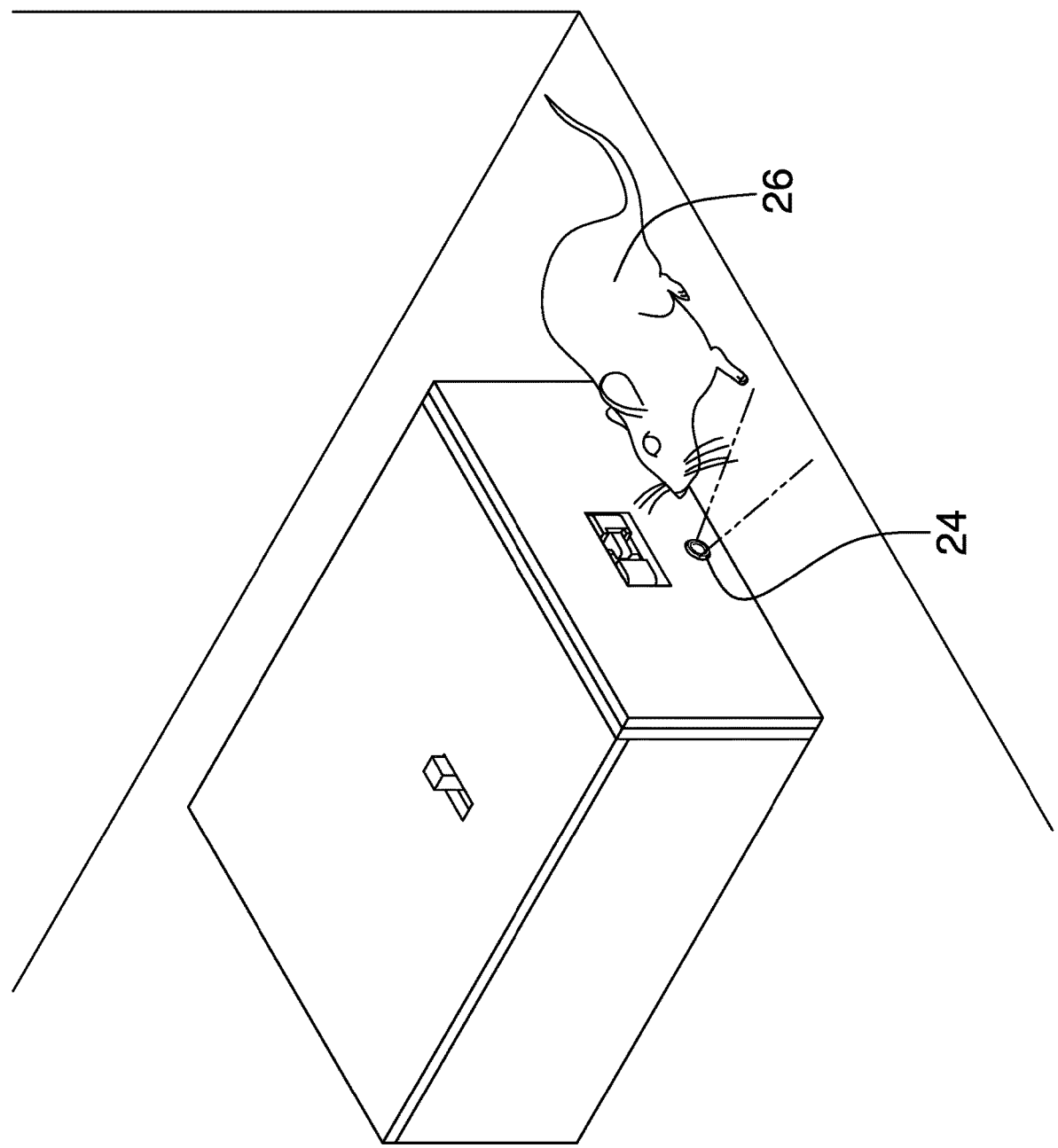
FIG. 6 is a front isometric in-use view of an embodiment of the disclosure.
Figure 7:
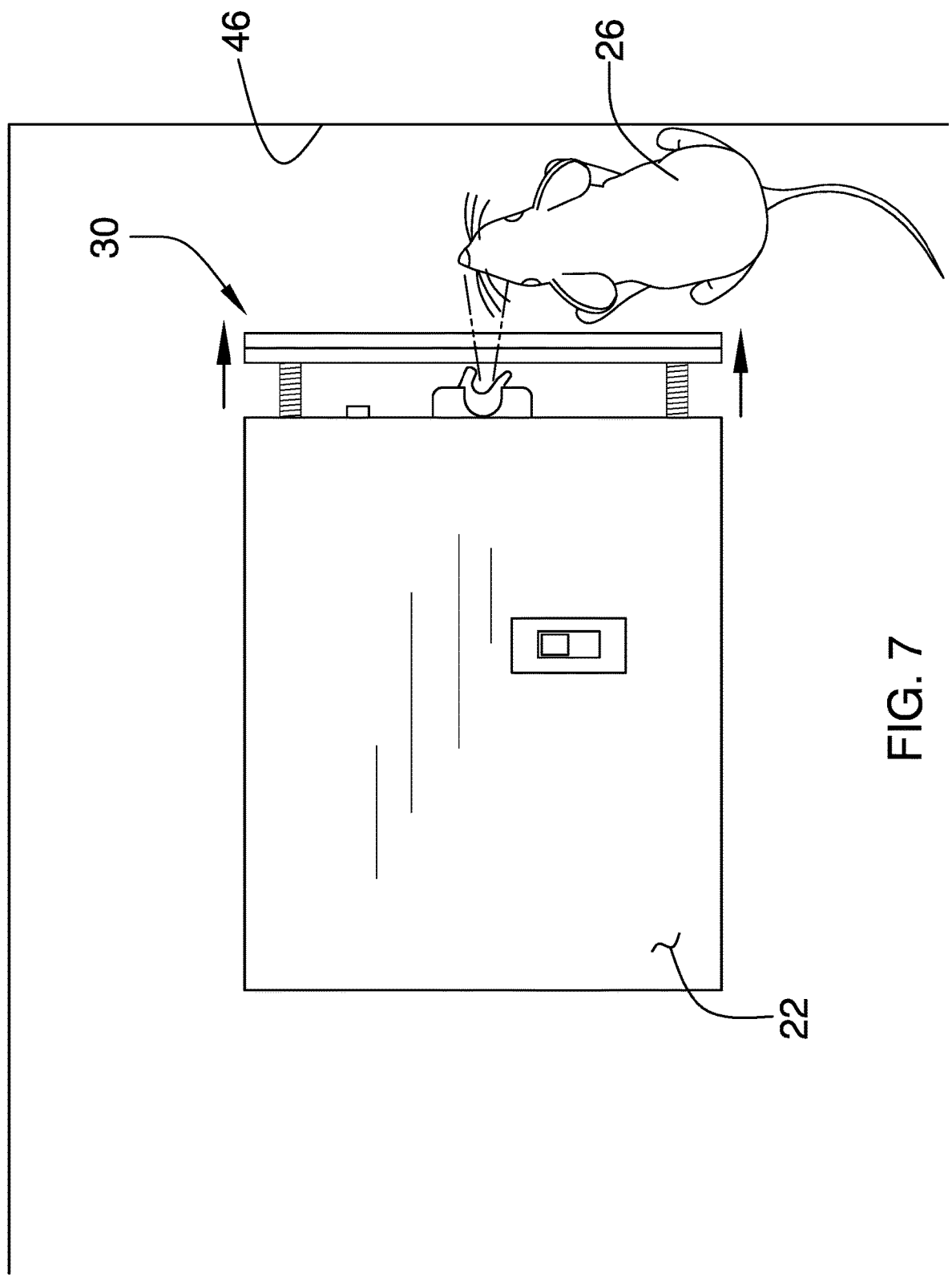
FIG. 7 is a top view of an embodiment of the disclosure as a ram thereof is being deployed.
Figure 8:
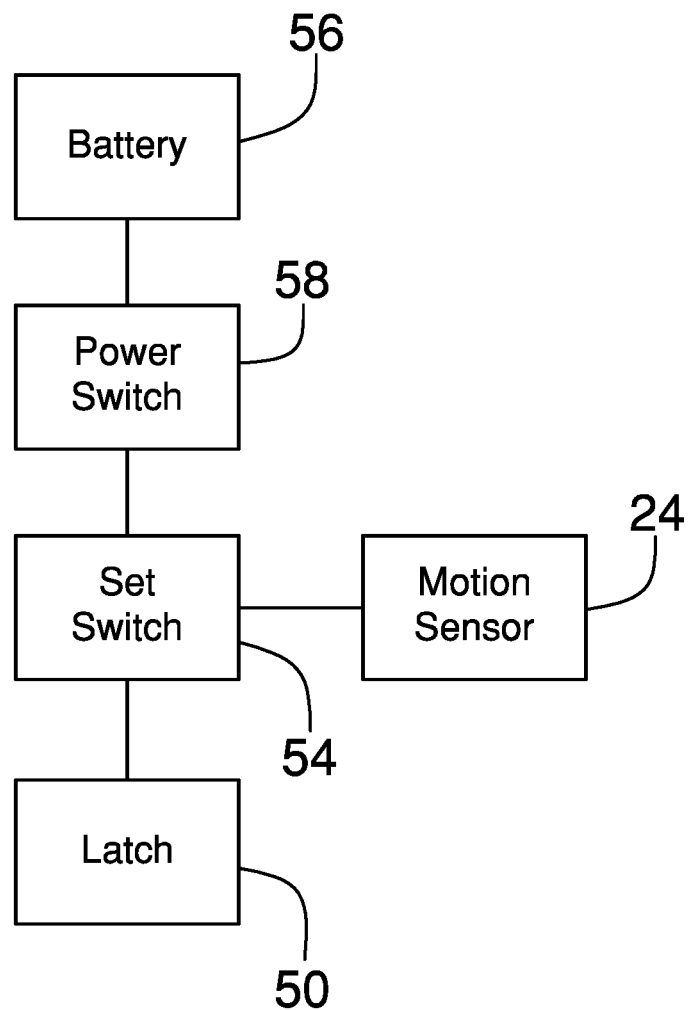
FIG. 8 is a schematic view of an embodiment of the disclosure.

A ram 28 is mounted on the housing 12. The ram 28 extends outwardly from the front wall 20 and is movable toward or away from the front wall 20. The ram 28 includes a panel 30 that has an outer surface 32 facing away from the housing 12 and the outer surface 32 is vertically oriented. The outer surface 32 has a movement distance, away from the front wall 20, typically between 3.0 inches and 9.0 inches. The outer surface 32 may have any useful size though typically it will have a width between 5.0 inches and 12.0 inches and a height between 3.0 inches and 8.0 inches. The panel 30 may have a size that matches the size of the front wall 20 of the housing 12 as is shown in FIG. 2, though such would be partially for the creation of a streamlined unit. The panel 30 has an aperture 34 extending therethrough that is aligned with the motion sensor 24. Thus the motion sensor 24 can detect heat radiation through the aperture 34 and in front of the panel 30. The panel 30 includes an inner layer 36 proximate to the perimeter wall 16 and an outer layer 38 distal to the perimeter wall 16. The inner layer 36 comprises a rigid material to form a base on which the outer layer 38, comprising a resiliently compressible material, is attached. A rod 40 is attached to the panel 30 and extends through the perimeter wall 16 and into the housing 12. The rod 40 is moveable inwardly and outwardly through the perimeter wall 16 and essentially mounts the panel 30 to the housing 12. As can be seen in the Figures, a plurality of rods 40 may be utilized. The rod 40 has an interior end 42 positioned distal to the panel 30 which comprises a stop that retains the rod 40 in engagement with the housing 12.

A driving system 44 is mounted to the housing 12 and is engaged with the ram 28. The driving system 44 is configured to retain the ram 28 in a set position having the panel 30 positioned adjacent to the front wall 20. The driving system 44 is configured to drive the panel 30 away from the housing in a deployed position. The driving system 30 is configured to deploy the panel 30 away from the housing 12 with sufficient force such that a rodent 26 positioned between the panel 30 and a facing surface 46 is killed by crushing forces between the panel 30 and the facing surface 46. The facing surface 46 may comprise any planar, firm surface and will often comprise a surface of a dwelling wall along a path known to be travelled by rodents. The driving system 44 is in communication with the motion sensor 24 such that the driving system 44 deploys the panel 30 when the motion sensor 24 detects motion.

The driving system 44 may include any conventional mechanical system which forcibly deploys the ram 28 outwardly from the housing 12. Thus, the rod 40 may be driven by a solenoid wherein the rod 40 is mechanically coupled to, or acts as, a plunger of the solenoid. The driving system 44 may comprise an electric motor is engaged with the rod by gears or a belt system. Pneumatic or hydraulically driven pistons may be utilized as well.

In one preferred embodiment of the apparatus 10, the driving system 44 includes a biasing member 48 that is engaged with the ram 28 and biases the ram 28 away from the front wall 20. The biasing member 48 comprises a compression spring that positioned on the rod and abuts the panel. As can be seen in the Figures, where multiple rods 40 are utilized, multiple biasing members 48, or springs, may also be utilized. While the spring does abut the panel 30 in FIG. 5, the spring may be positioned entirely within the housing 12 as well and biased against a catch between the stop 42 and the panel 30. The usage of a spring can be advantageous due to its low cost, low failure rate, and ability to select a spring having a desired compression force. A latch 50 releasably engages the ram 28 and retains the ram in the set position. The latch 50 is actuated from an engaged position with the ram 28 to a released positioned with the ram 28 when the motion sensor 24 detects motion. The latch 50 is mounted on the front wall 20 and releasably engages a receiver 52 on the panel. The receiver 52 may include a post and the latch 50 an electrically actuated hooked catch that rotates partially about the post to retain the post in place. As the post is moved against the hooked catch, the hooked catch rotates in a first direction to move around and hold the post. When the hooked catch is actuated, it is rotated in a second, opposite direction so that the post is released and the spring drives the ram 28 outwardly away from the housing 12.

A set switch 54, which functions generally as a control circuit, is mounted on the housing 12 and is in communication with the driving system 44, the ram 28, and the motion sensor 24. The set switch 54 is actuated when the ram 28 is in the set position to place the driving system 44 and the motion sensor 24 in communication with each other such that the driving system 44 is actuated by the set switch 54 to deploy the ram 28 when the motion sensor 24 detects motion. In the embodiment shown in FIG. 2, the set switch 54 is actuated by the panel 30 when the ram 28 is in the set position. The set switch 54 essentially sets the apparatus 10 for operation by allowing the driving system 44 to deploy the ram 28 when the motion sensor 24 detects motion.

A power source is electrically coupled to the set switch 54 and may comprise a battery 56 that is mounted in the housing 12. While multiple types of conventional batteries may be utilized, one particular battery may include a 12V DC sealed lead acid battery. Such a battery would require infrequent recharging and would provide a large weight for the housing 12 to counteract the deployment motion of the ram 28. It should be noted that the housing 12 should have a weight, including all structures described above not including the ram 28, which is greater than 1.0 lbs to ensure stability of the housing 12 when the ram 28 is deployed. A power switch 58 is mounted on the housing and is electrically coupled to the battery. The power switch 58 may extend through the top wall 22 as is shown in FIG. 1. The power switch 58 is actuated to turn power on or off to the set switch 54.

In use, the housing 12 is positioned on a floor or shelve adjacent to an area known to be frequented by rodents 26. The ram 28 is positioned such that it faces the facing surface 46, which is most typically a wall, and such that it will strike the facing surface 46 when deployed. The ram 28 is placed in the set position as shown in FIG. 1 so that the set switch 54 is actuated and the latch 50 engages the ram 28. Should a rodent 26 walk in front of the panel 30, the motion sensor 24 will detect the rodent 26 and send a signal to the driving system 44 to deploy the ram 28. The ram 28 will quickly deploy and apply fatal crushing force on the rodent 26. The resiliently compressible material will deaden the sound emitted during the striking of the rodent/facing surface.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rodent killing assembly comprising:
   a housing having a bottom wall and a perimeter wall attached to and extending upwardly from the bottom wall, the perimeter wall bounding an interior of the housing, the perimeter wall including a front wall;
   a motion sensor being mounted on the housing and being directed outwardly away from the front wall;
   a ram being mounted on the housing, the ram extending outwardly from the front wall and being movable toward or away from the front wall, the ram including a panel having an outer surface facing away from the housing;
   a driving system being mounted to the housing and being engaged with the ram, the driving system being configured to retain the ram in a set position having the panel positioned adjacent to the front wall, the driving system being configured to drive the panel away from the housing in a deployed position, the driving system being configured to deploy the panel away from the housing with sufficient force such that a rodent positioned between the panel and a facing surface is killed by crushing forces between the panel and the facing surface, the driving system being in communication with the motion sensor such that the driving system deploys the panel when the motion sensor detects motion; and
   wherein the outer surface is vertically oriented, the panel having an aperture extending therethrough and being aligned with the motion sensor.

2. The rodent killing assembly according to claim 1, further including a top wall being positioned on the perimeter wall.

3. The rodent killing assembly according to claim 1, wherein the motion sensor comprises a passive motion sensor.

4. The rodent killing assembly according to claim 3, wherein the motion sensor is configured to detect infrared radiation.

5. The rodent killing assembly according to claim 1, wherein the ram includes a rod being attached to the panel, the rod extending through the perimeter wall and into the housing, the rod being moveable inwardly and outwardly through the perimeter wall.

6. The rodent killing assembly according to claim 1, wherein the panel is forwardly positioned relative to an entirety of the housing, such that the housing is configured for being positioned spaced from the facing surface such that space between the panel and the facing surface is unobstructed above and at each end of the panel.

7. The rodent killing assembly according to claim 1, wherein the panel includes an inner layer proximate to the perimeter wall and an outer layer distal to the perimeter wall, the inner layer comprising a rigid material, the outer layer comprising a resiliently compressible material.

8. The rodent killing assembly according to claim 5, wherein the driving system includes:
   a biasing member being engaged with the ram and biasing the ram away from the front wall; and
   a latch releasably engaging the ram and retaining the ram in the set position, the latch being actuated from an engaged position with the ram to a released positioned with the ram when the motion sensor detects motion.

9. The rodent killing assembly according to claim 8, wherein the biasing member comprises a compression spring positioned on the rod and abutting the panel.

10. The rodent killing assembly according to claim 8, wherein the latch is mounted on the front wall, the latch releasably engaging a receiver on the panel.

11. The rodent killing assembly according to claim 1, further including a set switch being mounted on the housing and being in communication with the driving system, the ram, and the motion sensor, the set switch being actuated when the ram is in the set position to place the driving system and the motion sensor in communication with each other such that the driving system is actuated by the set switch to deploy the ram when the motion sensor detects motion.

12. The rodent killing assembly according to claim 11, wherein the set switch is actuated by the panel when the ram is in the set position.

13. The rodent killing assembly according to claim 11, further including a battery being mounted in the housing and being electrically coupled to the set switch.

14. The rodent killing assembly according to claim 13, further including a power switch being mounted on the housing and being electrically coupled to the battery, the power switch being actuated to turn power on or off to the set switch.

15. A rodent killing assembly comprising:
   a housing having a bottom wall and a perimeter wall attached to and extending upwardly from the bottom wall, the perimeter wall bounding an interior of the housing, the perimeter wall including a front wall, a top wall being positioned on the perimeter wall;
   a motion sensor being mounted on the housing and being directed outwardly away from the front wall, the motion sensor comprising a passive motion sensor, the motion sensor being configured to detect infrared radiation;

a ram being mounted on the housing, the ram extending outwardly from the front wall and being movable toward or away from the front wall, the ram including:
  a panel having an outer surface facing away from the housing, the outer surface being vertically oriented, the panel having an aperture extending therethrough and being aligned with the motion sensor, the panel including an inner layer proximate to the perimeter wall and an outer layer distal to the perimeter wall, the inner layer comprising a rigid material, the outer layer comprising a resiliently compressible material;
  a rod being attached to the panel, the rod extending through the perimeter wall and into the housing, the rod being moveable inwardly and outwardly through the perimeter wall;
a driving system being mounted to the housing and being engaged with the ram, the driving system being configured to retain the ram in a set position having the panel positioned adjacent to the front wall, the driving system being configured to drive the panel away from the housing in a deployed position, the driving system being configured to deploy the panel away from the housing with sufficient force such that a rodent positioned between the panel and a facing surface is killed by crushing forces between the panel and the facing surface, the driving system being in communication with the motion sensor such that the driving system deploys the panel when the motion sensor detects motion, the driving system including:
  a biasing member being engaged with the ram and biasing the ram away from the front wall, the biasing member comprising a compression spring positioned on the rod and abutting the panel;
  a latch releasably engaging the ram and retaining the ram in the set position, the latch being actuated from an engaged position with the ram to a released positioned with the ram when the motion sensor detects motion, the latch being mounted on the front wall, the latch releasably engaging a receiver on the panel;
a set switch being mounted on the housing and being in communication with the driving system, the ram, and the motion sensor, the set switch being actuated when the ram is in the set position to place the driving system and the motion sensor in communication with each other such that the driving system is actuated by the set switch to deploy the ram when the motion sensor detects motion, the set switch being actuated by the panel when the ram is in the set position;
a battery being mounted in the housing and being electrically coupled to the set switch; and
a power switch being mounted on the housing and being electrically coupled to the battery, the power switch being actuated to turn power on or off to the set switch.

* * * * *